United States Patent [19]
Taniguchi

[11] Patent Number: 5,424,336
[45] Date of Patent: Jun. 13, 1995

[54] MANUFACTURING APPARATUS AND METHOD FOR FINE HOLLOW PARTICLES

[75] Inventor: Toru Taniguchi, Tokyo, Japan

[73] Assignee: Reica Corp., Japan

[21] Appl. No.: 996,044

[22] Filed: Dec. 23, 1992

[30] Foreign Application Priority Data

Dec. 27, 1991 [JP] Japan .................................. 3-346263
Oct. 2, 1992 [JP] Japan .................................. 4-265053

[51] Int. Cl.$^6$ ............................ C08J 9/28; C08J 9/32; B01J 13/02
[52] U.S. Cl. ........................................ 521/56; 264/50; 521/60
[58] Field of Search ...................... 521/56, 60; 264/50

[56] References Cited

U.S. PATENT DOCUMENTS

| | | | |
|---|---|---|---|
| 3,615,972 | 10/1971 | Morehouse, Jr. et al. | 521/56 |
| 3,960,583 | 6/1976 | Netting et al. | 521/78 |
| 4,075,138 | 2/1978 | Garner | 521/56 |
| 4,882,362 | 11/1989 | Weimann et al. | 521/56 |

*Primary Examiner*—Morton Foelak
*Attorney, Agent, or Firm*—Dickstein, Shapiro & Morin

[57] ABSTRACT

In manufacturing hollow particles, gas is supplied from a gas cylinder to a first tank under pressure for solution in a raw material liquid in the first tank for the particles. The resulting raw material liquid is supplied to a second tank where the liquid is stirred with a dispersing medium under pressure, thereby forming a compressed emulsion in the second tank. As the compressed emulsion is discharged to the outside, it is released from the compressed state so that the gas dissolved in corpuscles of the raw material liquid in the emulsion will come out as bubbles. Thus since the corpuscles in the emulsion become hollow particles, an emulsion containing fine hollow particles of the raw material liquid as nuclei is obtained. Therefore it is possible to obtain a large quantity of fine hollow particles with ease.

7 Claims, 11 Drawing Sheets

MANUFACTURING APPARATUS AND METHOD FOR FINE HOLLOW PARTICLES

BACKGROUND OF THE INVENTION

1. Field of the Invention

This invention relates to an apparatus for and a method of manufacturing fine hollow particles, and more particularly to an apparatus for and a method of manufacturing fine hollow particles using a porous member.

2. Description of the Related Art

Hollow particles are empty like, for example, microcapsules and have a function different from that of mere ordinary particles, which are solid inside. Hollow particles themselves are light in weight and can be manufactured from only a reduced quantity of raw material. A material solidified from a mixture containing such hollow particles is excellent in thermal insulation and sound-proofness. Further a desired substance may be introduced into the hollow portions of the hollow particles.

The known hollow particles such as so-called microbeads have a particle diameter from several $\mu$m to several tens of $\mu$m. On the other hand, however, as the application and use of hollow particles has been expanded, the necessity of hollow particles having a small particle diameter of several $\mu$m, i.e. fine hollow particles is on the gradual increase.

However, with the conventional technology, easy and mass production of fine hollow particles having a particle diameter of several $\mu$m could not be achieved.

SUMMARY OF THE INVENTION

It is therefore an object of this invention to provide an apparatus for and a method of manufacturing a large quantity of fine hollow particles with ease.

The above object can be accomplished by a method of manufacturing hollow particles, wherein a compressed emulsion containing liquid corpuscles formed by dissolving gas under pressure is converted from a pressurized state into a normal-pressure state so that the liquid corpuscles in the emulsion are foamed.

According to a first method for obtaining a compressed emulsion containing the liquid corpuscles in which gas is dissolved under pressure, the raw material liquid in which gas is dissolved under pressure is dispersed in a compressed dispersing medium. According to a second method for obtaining the same compressed emulsion, the raw material liquid is dispersed in a dispersing medium liquid to form a starting emulsion, and then gas dissolvable in only the raw material liquid is supplied to the raw material liquid under pressure.

These methods may be carried out on the following apparatuses.

The first method can be carried out on an apparatus for manufacturing hollow particles, comprising: a first tank for storing a raw material liquid from which the hollow particles are to be manufactured; a second tank for storing a dispersing medium liquid in which the raw material liquid is to be dispersed; means for supplying the raw material liquid, which is stored in the first tank, to the second tank; means for preparing a starting emulsion by mixing the raw material liquid and the dispersing medium liquid in the second tank; means for supplying gas, which is dissolvable in only the raw material liquid, to the starting emulsion in the second tank under pressure to dissolve the gas in corpuscles dispersed in the raw material liquid, thereby obtaining a compressed emulsion in the second tank; and means for converting the compressed emulsion, which is obtained in the second tank, from a compressed state into a normal-pressure state.

The second method can be carried out on an apparatus for manufacturing hollow particles, comprising: a first tank for storing a raw material liquid from which the hollow particles are to be manufactured; means for pressurizing the interior of the first tank to compress the stored raw material liquid; means for dissolving gas in the raw material liquid stored in the first tank; a second tank for storing a dispersing medium liquid in which the raw material liquid is to be dispersed; means for pressurizing the interior of the second tank; means for supplying the compressed raw material, which is stored in the first tank, into the second tank whose interior is pressurized; means for preparing a compressed emulsion by mixing the raw material liquid and the dispersing medium liquid in the second tank; and means for converting the compressed emulsion, which is obtained in the second tank, from a compressed state into a normal-pressure state.

The phenomenon whereby the degree of dissolution of gas in liquid increases in proportion to pressure is generally known as Henry's rule.

In the foregoing methods, when the compressed emulsion containing the liquid corpuscles, in which gas is dissolved under pressure, is converted from a compressed state into a normal-pressure state, foams will be built inside the liquid corpuscles constituting the emulsion so that the liquid corpuscles will become hollow particles.

According to the first method mentioned above, by dispersing the raw material liquid, in which gas is dissolved under pressure, in a compressed dispersing medium, it is possible to obtain a compressed emulsion containing the liquid corpuscles in which gas is dissolved under pressure. Then this compressed emulsion is converted from a compressed state into a normal-pressure state so that hollow particles are formed in the resulting emulsion.

According to the second method mentioned above, by dispersing the raw material liquid in a dispersing medium liquid to form a starting emulsion and then supplying the gas, which is dissolvable in only the raw material liquid, it is possible to obtain a compressed emulsion containing liquid corpuscles in which gas is dissolved under pressure. Then the compressed emulsion is converted from a compressed state into a normal-pressure state so that hollow particles are formed in tile resulting emulsion.

The emulsion containing hollow particles manufactured according to this invention can be broken easily by decompression. As the emulsion containing the hollow particles manufactured according to this invention is decompressed, the volume of the gas within the hollow particles will continue expanding so that the hollow particles will finally be burst. This causes tile emulsion to broken so that the raw material liquid and the dispersing medium are separated from each other.

In short, in this invention, as gas is supplied from a gas cylinder to the first tank under pressure, it will be dissolved in the raw material liquid in the first tank. Then the raw material liquid, in which gas is dissolved, is supplied to the second tank while the liquid is stirred with the dispersing medium under pressure to form a compressed emulsion. As the compressed emulsion is discharged to the outside, it is released from the compressed state so that the gas dissolved in corpuscles of the raw material liquid in the emulsion will come out as bubbles. Thus since the corpuscles in the emulsion become hollow particles, an emulsion containing fine hollow particles of the raw material liquid as nuclei is obtained. Therefore it is possible to obtain a large quantity of fine hollow particles with ease. When the interior of the second tank is decompressed as a compression pump mounted in the second tank is reversely rotated, the hollow particles will be burst, thus realizing a so-called emulsion breaker.

DETAILED DESCRIPTION

Various embodiments of this invention will now be described with reference to the accompanying drawings.

Figures 1A, 1B:
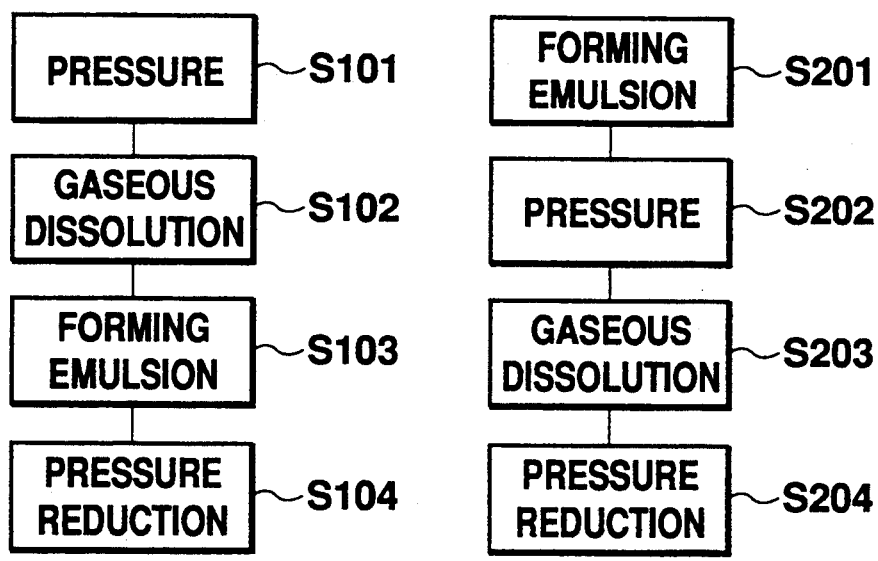
FIGS. 1(a) and 1(b) are flow diagrams respectively illustrating first and second manufacturing methods of this invention.

FIGS. 1(a) and 1(b) are flow diagrams respectively illustrating first and second manufacturing methods of this invention. In the first method shown in FIG. 1(a), gas is supplied under pressure (S101) to a raw material liquid, from which hollow particles are to be manufactured, for dissolution in the raw material liquid (S102). Then the raw material liquid, in which the gas is dissolved, is dispersed in a dispersing medium to form a starting emulsion (S103), whereupon the whole starting emulsion is decompressed (S104) so that corpuscles constituting the emulsion will become hollow particles. At step S104, when decompression of the whole emulsion continues, the volume of the gas within the hollow particles will continue expanding so that the hollow particles will finally burst. This causes the emulsion to be broken so that the raw material liquid and the dispersing medium are separated from each other. With continued decompression at step S104, it is possible to realize a so-called emulsion breaker easily.

In the second method shown in FIG. 1(b), a starting emulsion is formed (S201), and gas dissolvable in only corpuscles (dispersing medium) constituting the emulsion is supplied thereto under pressure (S202). When the gas dissolves in only the corpuscles of the emulsion (S203) and the whole emulsion is decompressed (S204), then the corpuscles of the emulsion becomes hollow particles. The gas to be dissolved in the raw material liquid should preferably be inactive gas such as nitrogen or argon gas. The gas to be used in the second manufacturing method, namely, the gas to be dissolved in only the corpuscles constituting the emulsion is selected according to the characteristic of the raw material liquid. For example, if a non-polarity solvent is used as the raw material liquid, the gas to be supplied under pressure may be methane so that the gas can be dissolved in only the corpuscles constituting the emulsion, because methane is dissolvable in a non-polarity organic solvent very well but is hardly dissolvable in water.

Figure 2A:
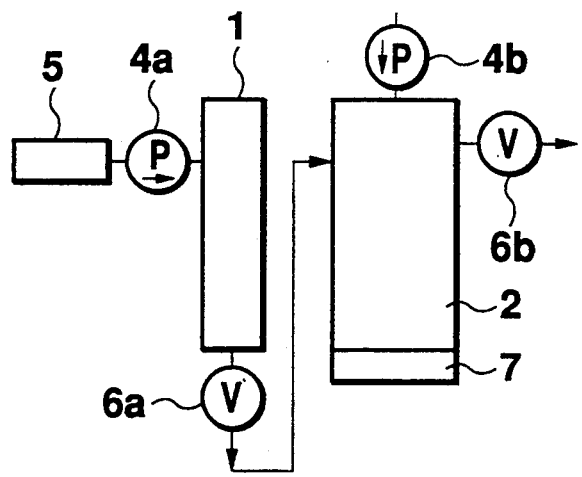
FIGS. 2(a) and 2(b) are diagrams illustrating the principles of a first manufacturing apparatus of the invention.
Figure 2B:
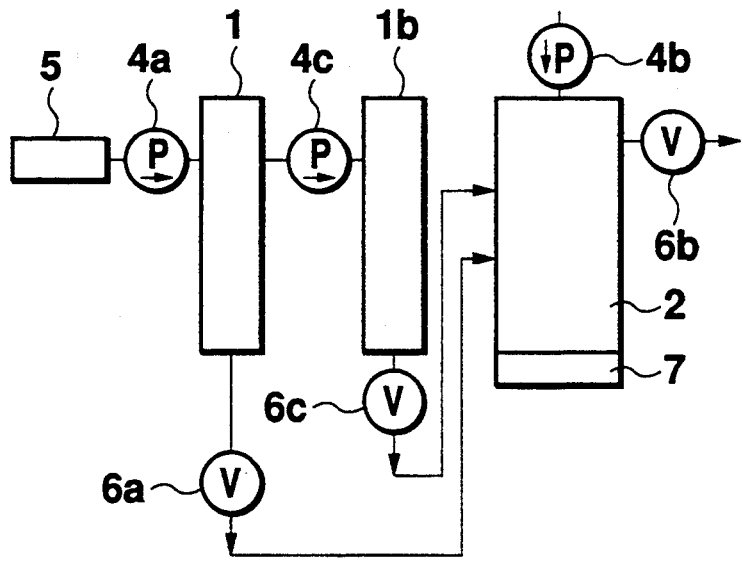

FIGS. 2(a) and 2(b) are diagrams illustrating the principles of a first manufacturing apparatus for carrying out the first manufacturing method shown in FIG. 1(a).

As shown in FIGS. 2(a) and 2(b), the first manufacturing apparatus comprises a raw material tank (hereinafter called "first tank") 1, a dispersing medium tank (hereinafter called "second tank") 2, a first pump 4a for pressurizing the first tank 1, a second pump 4b for pressurizing the second tank 2, a gas cylinder 5 connected to the first pump 4a, a first valve 6a for regulating the quantity of the liquid to be supplied from the first tank 1 to the second tank 2, a mixer 7 for stirring the contents of the second tank to form a starting emulsion, and a second valve 6b to be used when taking out the resulting mixture from the second tank 2. In operation, the gas from the gas cylinder 5 is supplied to the first tank 1 under pressure by the first pump 4a so that the gas is dissolved in the raw material liquid stored in the first tank 1. Then the raw material liquid, in which the gas is dissolved, is supplied to the second tank 2 via the first valve 6a. The first valve 6a serves to regulate the quantity of raw material liquid to be supplied to the second tank 2 and to keep the second tank 2 in a compressed state.

The supply of liquid from the first tank 1 to the second tank 2 will happen to occur simply when adjusting the respective pressures of the first and second pumps 4a, 4b; if the pressure of the first pump 4a is preset to be larger than that of the second pump 4b, the raw material liquid in the first tank 1 will be supplied to the second tank 2. The raw material liquid supplied to the second tank 2 is stirred with the dispersing medium in the second tank 2 to form an emulsion. At that time, since the second tank 2 also is pressurized by the second pump 4b, the gas dissolved in the raw material liquid will not come out in the second tank 2. The compressed emulsion thus formed in the second tank 2 as mixed by the mixer 7 will be discharged out of the second tank 2 via the second valve 6b. Since the pressure outside the second tank 2 is normal, the gas is dissolved incompletely so that foaming will occur in the corpuscles constituting the emulsion and will finally become hollow particles. Thus hollow particles with the raw material liquid as nuclei have been obtained.

Now when the interior of the second tank 2 is decompressed by reversely rotating the second pump 4b equipped with the second tank 2, the volume of gas in the individual hollow particles will continue expanding until they burst. This burst of hollow particles breaks the emulsion to separate the raw material liquid and the dispersing medium from one another. Thus with continued decompressing in the second tank 2, it is possible to realize an emulsion breaker.

In the first manufacturing apparatus, as shown in FIG. 2(b), there may be provided an auxiliary tank (hereinafter called "third tank") 1b, separate from the second tank 2, for storing the dispersing medium so that the dispersing medium can be supplied to the second tank 2 while the raw material liquid is supplied from the first tank 1 to the second tank 2. In this case, the third tank 1b is equipped with a third pump 4c for supplying the dispersing medium from the third tank 1b to the second tank 2. Consequently, if the pressure of the third pump 4c is larger than that of the second pump 4b, the raw material liquid in the third tank 1b will be supplied to the second tank 2.

Figure 3A:
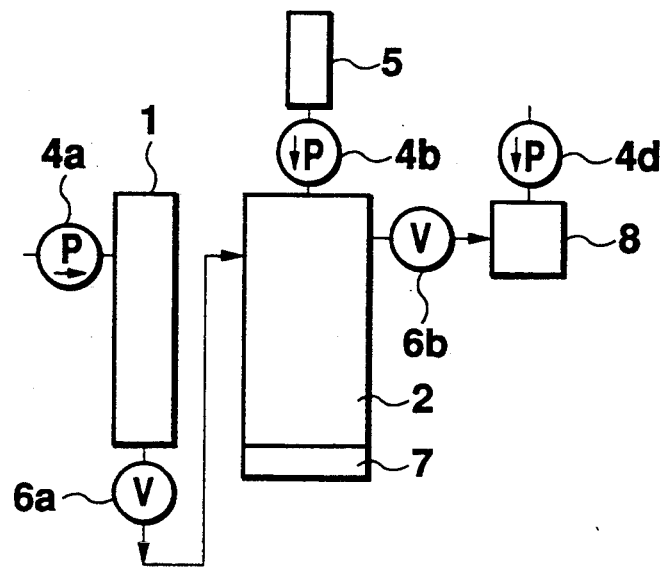
FIGS. 3(a) and 3(b) are diagrams illustrating the principles of a second manufacturing apparatus of the invention.
Figure 3B:
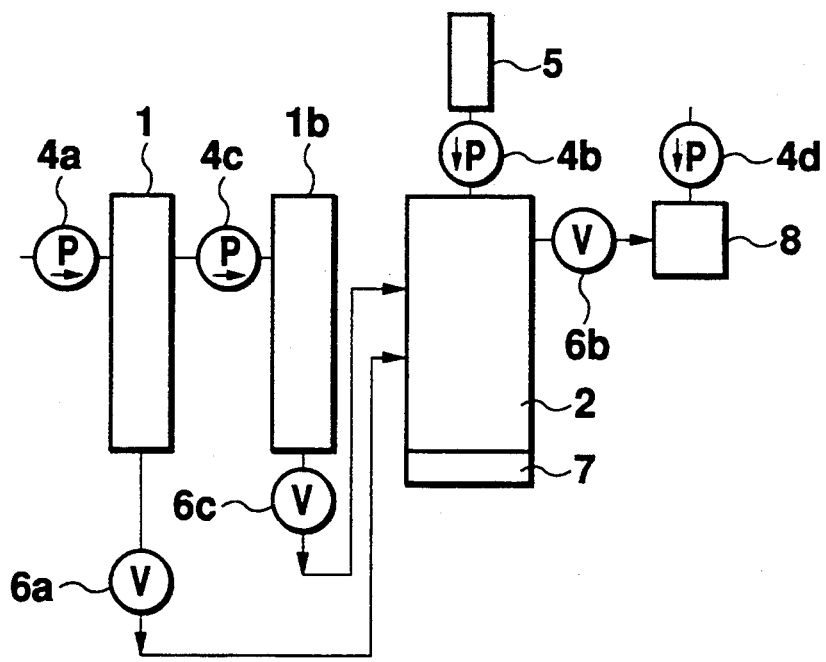

FIGS. 3(a) and 3(b) illustrate the principles of a second manufacturing apparatus for carrying out the second manufacturing method of the invention. With the second manufacturing apparatus, unlike the first manufacturing apparatus, the gas cylinder 5 is not connected to the first tank 1, but is connected to the second tank 2. In the second manufacturing apparatus, the gas dissolved in only the raw material liquid will not be supplied to second tank 2 under pressure until the emulsion is formed in the second tank 2. Therefore the first and third pumps 4a, 4c of FIGS. 3(a) and 3(b) are not used for compressing the interior of the second tank, but are used only for supplying both the raw material liquid and the dispersing medium to the second tank 2. The quantity of the dispersing medium to be supplied is adjusted by a third valve 6c.

For converting the emulsion from a compressed state into a normal-pressure state, in the second manufacturing apparatus of FIGS. 3(a) and 3(b), a separating tank (hereinafter called "fourth tank") 8 is used to take out part of the contents of the second tank 2 in the compressed state. The fourth tank 8 may be separated from the second tank 2. Transfer of liquid from the second tank 2 to the fourth tank 8 is performed via the second valve 6b. The fourth tank 8 is equipped with a fourth pump 4d for maintaining the internal pressure of the fourth tank 8 at a high level. Therefore with this dispersing tank 2, the interior of the fourth tank 8 is decompressed after part of the emulsion has been taken out from the second tank 2 to the fourth tank 8 where hollow particles are obtained. The second tank 2 may be used in the first manufacturing apparatus shown in FIGS. 2(a) and 2(b).

The mixer 7 serves to assist in forming an emulsion in the second tank 2 and is an important point in forming excellent hollow particles. The mixer 7 should by no means be limited to this illustrated form. Following are preferred structural embodiments of the manufacturing apparatus.

First Embodiment

Figure 4:
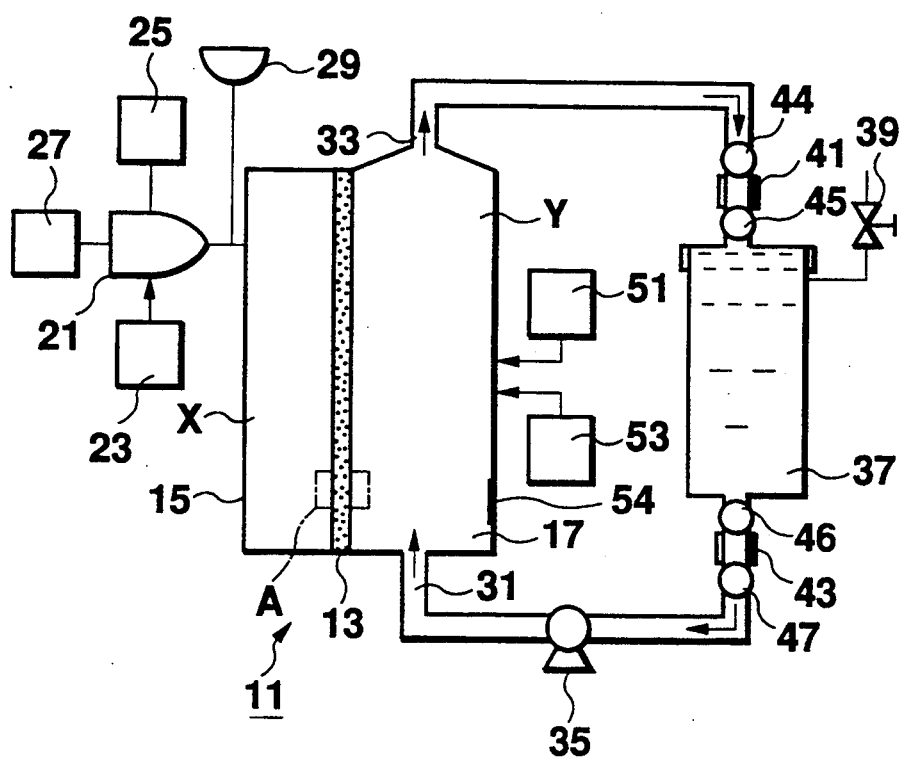
FIG. 4 is a diagram showing the construction of a manufacturing apparatus according to a first embodiment of the invention.

FIG. 4 shows the construction of a manufacturing apparatus according to a first embodiment of this invention. This manufacturing apparatus can manufacture very fine particles and hence is called a fine hollow particle manufacturing apparatus.

As shown in FIG. 4, the fine hollow particle manufacturing apparatus 11 has a porous member in the form of a porous wall 13, on one side of which a raw material tank (hereinafter called "first tank") 15 is mounted, and on the other side of which a dispersing tank (hereinafter called "second tank") 17 is mounted. The first tank 15 stores a raw material liquid x, from which final hollow particles are to be manufactured, and the second tank 17 stores a dispersing medium liquid y at the initial stage of the manufacturing. The dispersing medium liquid y and the raw material liquid x are not dissolvable with one another.

Connected to the first tank 15 of the manufacturing apparatus 11 is an adjusting device 21 to which a first internal pressure controlling means 23, a liquid supplying device 25, a gas supplying device 27 and an ultra-fine corpuscle supplying device 29 are connected.

On the other hand, a supply duct 31 and a discharge duct 33 are connected to the second tank 17, and a pump 35 is connected to the supply duct 31. The supply duct 31 and the discharge duct 33 are connected to a storage tank 37 to which a valve 39 is connected. Therefore when cocks 44–47 are opened, the liquid is circulated in the second tank 17, the discharge duct 33 and the storage tank 37 by the action of the pump 35. Also connected to the second tank 17 are a liquid supplying means 51 for supplying the liquid to the second tank 17, and a second internal pressure controlling means 53 for controlling the internal pressure of the second tank 17. In the second tank 17, a temperature control device 54 is mounted for controlling the temperature of the liquid in the second tank 17. The temperature control device 54 performs feedback control so that the temperature in the second tank 17 can be set to a desired temperature.

The temperature control device 54 may be mounted in either the supply duct 31 or the storage tank 37, and the ultra-fine corpuscle supplying device 29 may be mounted on the second-tank (17) side. The second internal pressure controlling means 53 also serves to reduce the internal pressure of the second tank 17 to a value lower than i atmospheric pressure.

The storage tank 37 is connected to the discharge duct 33 and the supply duct 31 by first and second connecting portions 41, 43, respectively. Therefore, when the cocks 44–47 are closed, the flow of liquid will be stopped; and when the first and second connecting portions 41, 43 are separated, the storage tank 37 can be removed from the manufacturing apparatus 11.

The operation of the manufacturing apparatus shown in FIG. 4 will now be described with reference to FIGS. 1(a) and 1(b) illustrating the manufacturing methods of this invention.

While the raw material liquid x is supplied to the first tank 15 by the liquid supplying means 25, the dispersing medium liquid y is supplied to the second tank 17 by the liquid supply means 51. Then the first and second internal pressure controlling means 23, 53 increase the respective internal pressures of the first and second tanks 15, 17 (compressing step S101). The gas is then supplied to the first tank 15 under pressure by the gas supplying means 27 for solution in. the raw material liquid x. Ultra-fine corpuscles are supplied to the first tank 15 from the ultra-fine corpuscle supplying means 29 for mixing in the raw material liquid x. Thus the first tank 15 is filled up with a mixture r of the ultra-fine corpuscles and raw material liquid x in which the gas is dissolved.

Figure 5A:
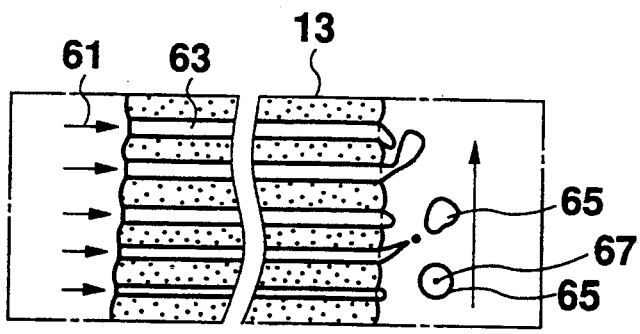
FIGS. 5(a) and 5(b) are enlarged views of a portion A of FIG. 4.
Figure 5B:
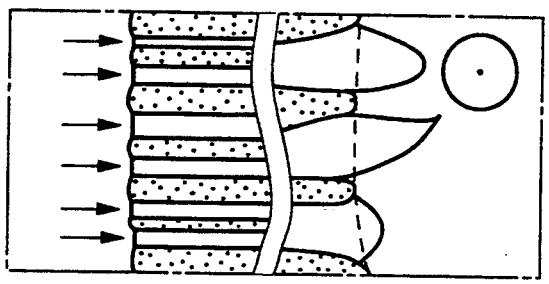

As the first and second internal pressure controlling means 23, 53 are activated in such a manner that the internal pressure of the first tank 15 is higher than the internal pressure of the second tank 17, the mixture r (raw material liquid+gas+ultra-fine corpuscles) permeates through the porous member 13, as shown in FIGS. 5(a) and 5(b).

FIGS. 5(a) and 5(b) are enlarged diagrams showing a portion A indicated by dash-and-dot lines in FIG. 4, illustrating how the mixture r permeates through the porous member 13. As shown in FIGS. 5(a) and 5(b), the mixture r is supplied toward the second tank 17 through the porous member 13 by the internal pressure 61 of the first tank 15. The porous member 13 has a multiplicity of small pores 63, through which the mixture r is to be supplied to the second tank 17. At that time, in the second tank 17, as liquid flow is caused by the pump 35, the mixture r oozing out from the small pores 63 will expand to a predetermined size, whereupon the mixture r will come off the surface of the porous member 13 to form fine corpuscles 65. The fine corpuscles 65 contain ultra-fine corpuscles 67. Partly because of the permeation of the mixture r and partly because of flow of the dispersing medium liquid not dissolved with the mixture r, a liquid mixture s contains the fine corpuscles 65. This is the mixture forming step S103 shown in FIG. 1(a).

Figure 6:
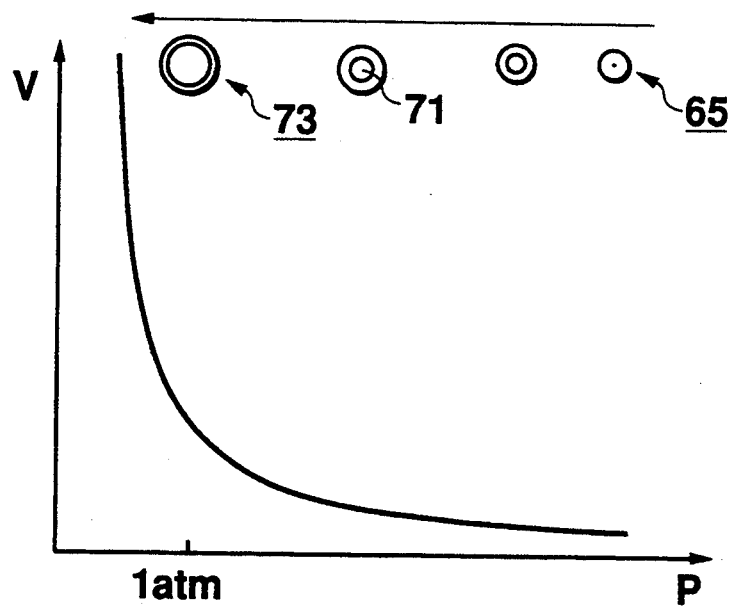
FIG. 6 is a graph illustrating successive steps of production of hollow particles as corpuscles of a raw material liquid in which gas is dissolved is converted from a compressed state into a normal-pressure state.

Since gas is dissolved in the fine corpuscles 65 of the raw material liquid x, the gas develops inside the individual fine corpuscles 65 to form hollows therein as they are decompressed. Existence of the ultra-fine corpuscles 67 contained in the fine corpuscles 65 facilitates developing gas inside the fine corpuscles 65. As hollows are formed inside the individual fine corpuscles 65, fine hollow particles are obtained. FIG. 6 illustrates how the fine hollow particles are obtained by decompression. In the graph of FIG. 6, the x coordinate represents pressure, and the y coordinate represents volume of gas in respect to the pressure; with continued decompression, the hollows 71 inside the fine corpuscles 65 expand so that hollow particles 73 will be formed when it reaches 1 atmospheric pressure.

In the manufacturing apparatus 11 shown in FIG. 4, decompression is performed as the storage tank 37 is separated from the manufacturing apparatus 11. Specifically, in performing the decompressing step S104, the cocks 44–47 are closed and then the connecting portions 41, 43 are separated so that the storage tank 37 is removed from the manufacturing apparatus 11. Then when the valve 39 is controlled, the internal pressure of the storage tank 37 will be lowered to obtain an emulsion containing fine hollow particles in the storage tank 37. Finally the fine hollow particles are obtained by separating the emulsion into the fine hollow particles and the dispersing medium.

Since the small pores 63 of the porous member 13 are several $\mu$m in size, it is possible to restrict the size of the hollow particles 73 to about 10 $\mu$m. To increase the particle size, the size of small pores 63 are varied by treating the surface of the porous member 13 with hydrogen fluoride. FIG. 5(b) is an enlarged diagram showing the porous member 13 whose surface has been treated with hydrogen fluoride. As shown in FIG. 5(b), since only one of opposite surfaces of the porous member 13 is treated with hydrogen fluoride, only part of this surface is dissolved and has the small pores 63 larger in size than those of the other surface. As a result, the individual small pores 63 have a generally bugle shape so that particles larger than usual can be manufactured.

Figure 7A:
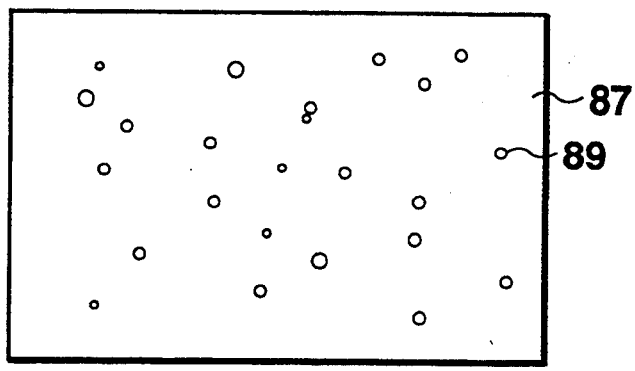
FIGS. 7(a) and 7(b) are diagrams showing an emulsion containing hollow particles manufactured by the manufacturing apparatus of the first embodiment.
Figure 7B:
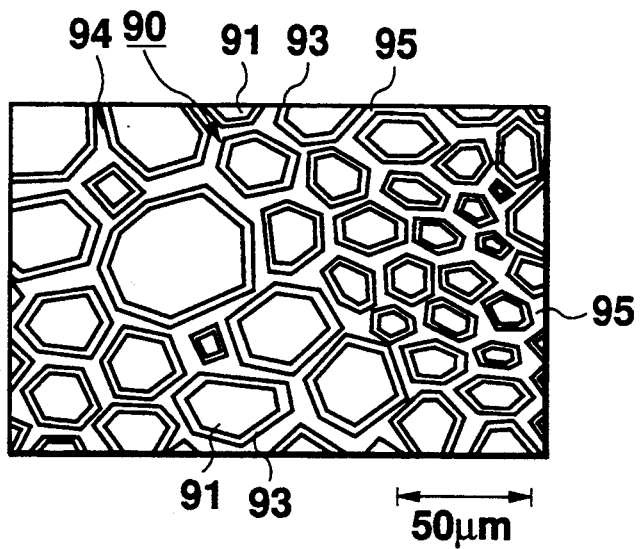

FIGS. 7(a) and 7(b) shows an emulsion containing the hollow particle 73 manufactured by the fine hollow particle manufacturing apparatus 11 of the first embodiment. FIG. 7(a) is an enlarged diagram showing the emulsion (containing the fine particles in which gas is dissolved) before foaming, the emulsion being identical in appearance with the usual emulsion. FIG. 7(b) is an enlarged diagram (same scale as FIG. 7(a)) showing the emulsion containing the hollow particles formed as the emulsion of 7(a) is decompressed to foam. As a result, the fine corpuscles 89 in FIG. 7(a) correspond to the fine corpuscles 65 in FIG. 6, and the hollow particles 90 in FIG. 7(b) correspond to the hollow particles 73 in FIG. 6.

1% of SDS (sodium dodecyl sulfide) is added to lamp oil and water as the raw material liquid and the dispersing medium, respectively, to form a compressed emulsion of FIG. 7(a) by the fine hollow particle manufacturing apparatus 11, whereupon the compressed emulsion is decompressed to form the emulsion of FIG. 7(b). Regarding the solution of gas, nitrogen gas is dissolved in lamp oil under 3 atmospheric pressures before the lamp oil is mixed with water.

As shown in FIG. 7(b), the emulsion containing the hollow particles 90 comprises hollows 91, oil films 93 covering the hollows 91, and water films 95 contiguous to the oil films 93 via borders 94. The individual oil films 93 are isolated from one another by the water films 95 so that the emulsion state is maintained; presumably, the individual particles 90 have the same surface electric charges as they repel one another. The hollow particles 90 have a diameter of 20–50 $\mu$m. This emulsion is so stable as to be maintained in the same state even when put on the shelf for a week after being formed. Since the volume of the hollows 91 vary according to the temperature, the hollow particles 90 will burst to break the emulsion in response to the temperature rise. To keep the emulsion stable, it should preferably be preserved in a cool and dark place.

Since this emulsion containing hollow particles not only has a very small specific weight but is also stable, it is possible to form foamed resin easily. Namely, to form foamed resin, a polymerization initializer may be added after producing an emulsion containing hollow particles.

If using a solution, in which polyvinyl acetate or polyethylene are dissolved in an organic solvent, as the raw material liquid x and using water as the dispersing medium liquid y, the surfaces of the hollow particles 90 will become hard simultaneously with the production of the hollow particles 90, thus obtaining ultra-fine microcapsules of polyethylene or polyvinyl acetate easily. In this case, water constituting the water films 95 is removed after the surfaces of the hollow particles 90 have become hard in the emulsion containing the hollow particles 90 as shown in FIG. 7(b), and then ultra-fine microcapsules of polyethylene or polyvinyl acetate will be obtained easily.

In this embodiment, the liquid is supplied to the second tank 17. Alternatively, the gas may be supplied to the second tank 17 so that fine corpuscles of the raw material liquid are formed on the surface of the porous member 13 as the raw material liquid is permeated through the porous member 13. Since this raw material liquid contains gas dissolved therein under high pressure, foams will develop inside the individual fine corpuscles of the raw material liquid simultaneously with the production of the fine corpuscles of the raw material liquid on the surfaces of the porous member 13. Thus if gas, instead of the liquid, is supplied to the second tank 17, foams will develop simultaneously with the production of the fine corpuscles on the surfaces of the porous member 13, and then hollow particles will be obtained on the surfaces of the porous member 13. At that time. if a solution, in which polyethylene is dissolved in a very volatile solvent such as acetone, is used, it is possible to obtain microcapsules of polyethylene easily by producing hollow particles and drying and hardening them. In the same manner as in the case of liquid, the produced microcapsules can be removed from the surfaces of the porous member as fluid (gas in this case) flows in the second tank 17.

With continued decompressing by the second internal pressure controlling means 53, the hollow particles 73 burst to break the emulsion, as described below.

Second Embodiment

Figure 8:
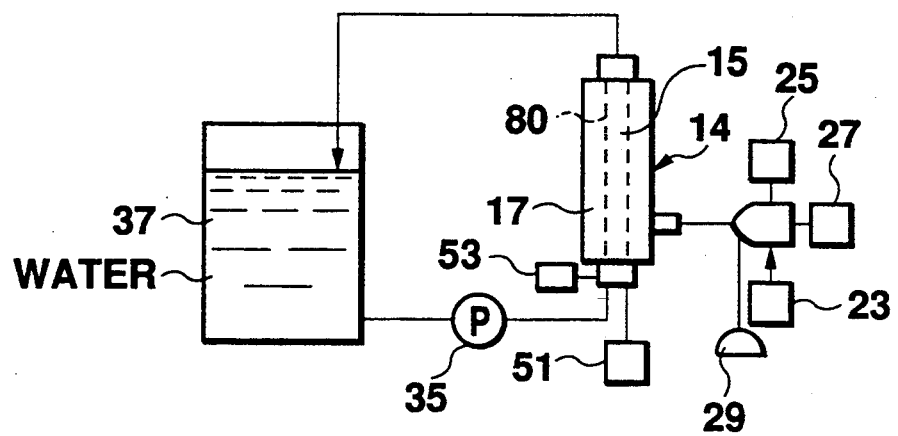
FIG. 8 is a diagram showing a manufacturing apparatus according to a second embodiment.

FIG. 8 shows the construction of a hollow particle manufacturing apparatus according to a second embodiment of this invention, in which the porous member 13 is in the form of a porous pipe 80, for example. In this embodiment, parts or elements corresponding to those of the first embodiment are designated by like reference numerals, and their description is omitted here. With this apparatus, like that of the first embodiment, it is possible to obtain a large quantity of hollow particles easily.

In the manufacturing apparatus of the second embodiment, hollow particles are obtained in the storage tank 37 whose interior pressure is normal. The storage tank 37 may be adapted either to be pressurized wholly or to be separated in part. Further if two identical porous pipes 80 are arranged in parallel to one another, it is possible to improve the efficiency of emulsion production.

For the manufacturing apparatuses and methods of this invention, the shape of the porous member 13, which is the significant point, should by no means be limited to the illustrated examples of the first and second embodiments and may be any other shape which is commercially available.

For the porous member 13 of this embodiment, various kinds of porous materials such as ceramics, preferably porous silica glass, may be used. Namely, silica glass of ejecta, which is plentiful in South Kyushu, Japan, is suitable as a raw material for the porous member 13. For production of this porous silica glass, lime and boric acid are added to ejecta, and the resulting mixture is dissolved at 1300° C. to form base glass from which porous glass will be made. This base glass is shaped into a pipe to conform with the final purpose, then is thermally treated at about 600°–750° C. to vary the structure of glass so that CaO and $B_2O_3$ of raw material are isolated to produce a separate layer. Since this layer is easy to dissolve in acid, it is possible to produce porous glass having an enormous number of fine pores as the layer comes out if the thermally treated product is treated with acid. The resulting porous silica glass is very suitable for the porous pipe member 13 of this invention, because it is easy to adjust the pore diameter during treating.

Third Embodiment

Figure 9:
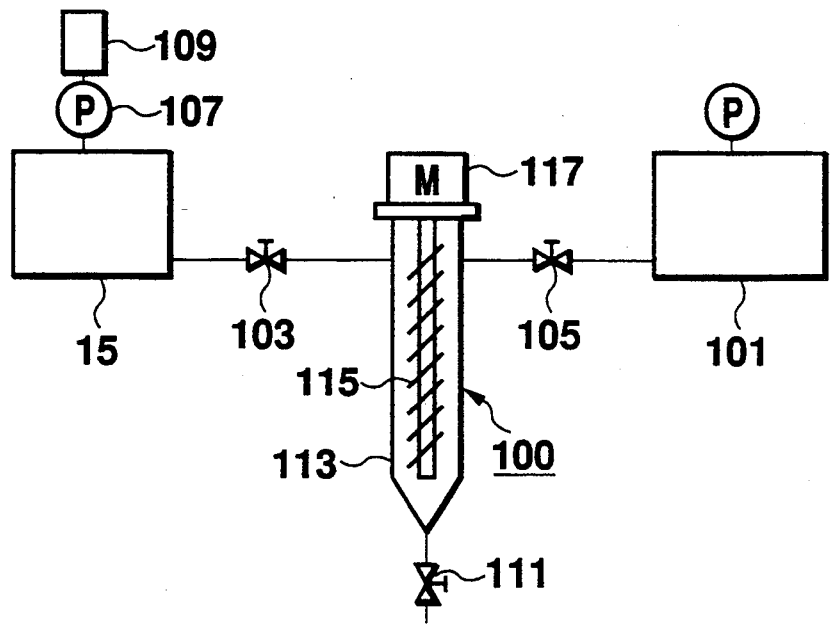
FIG. 9 is a diagram showing a manufacturing apparatus according to a third embodiment.

FIG. 9 shows the construction of a hollow particle manufacturing apparatus according to a third embodiment, in which a mixer 100 for forming a predetermined emulsion is used. A raw material liquid and a dispersing medium are supplied to the mixer 100 from a raw material tank (first tank) 15 and a dispersing medium supply tank (second tank) 101, respectively. The quantity of the raw material to be supplied to the mixer 100 from the first tank 15 is adjusted by a valve 103, and the quantity of the dispersing medium to be supplied to the mixer 100 from the second tank 101 by a second valve 105. A first pump 107 is connected to the first tank 15 so that gas is supplied to the first tank 15 from a gas cylinder 109 under pressure. When a valve 111 is opened, the emulsion produced by the mixer 100 will be discharged to the outside.

Figure 10:
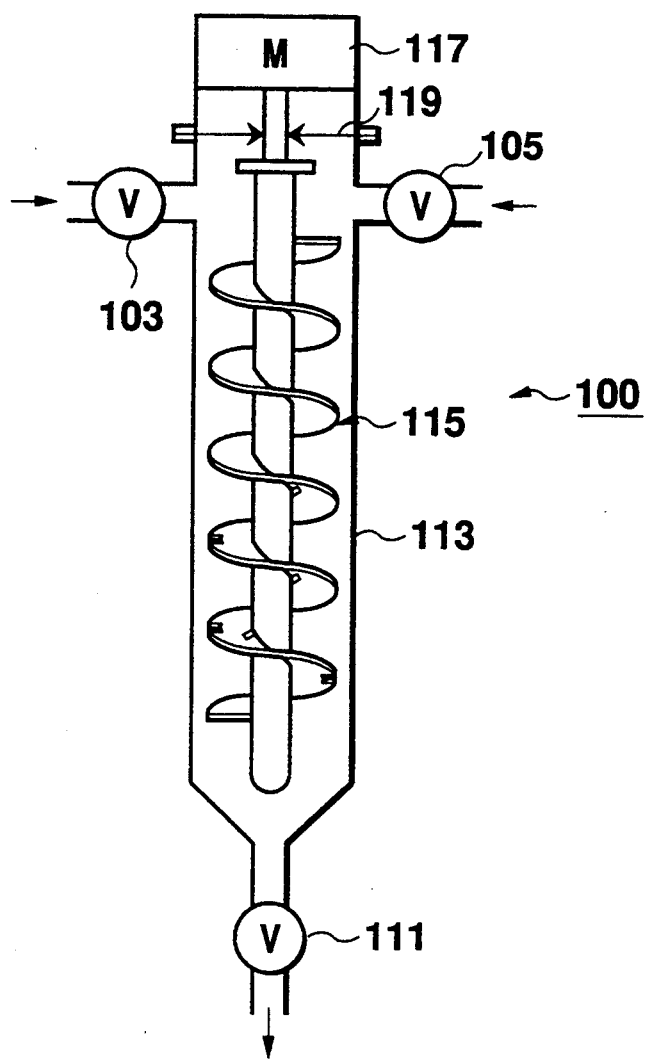
FIG. 10 is a diagram showing a mixer to be used in the manufacturing apparatus of the third embodiment.
Figure 11A:
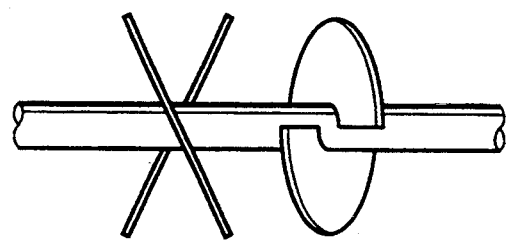
FIGS. 11(a) through 11(d) are diagrams showing various other stirring blades to be used in the mixer shown in FIG. 10.
Figure 11B:
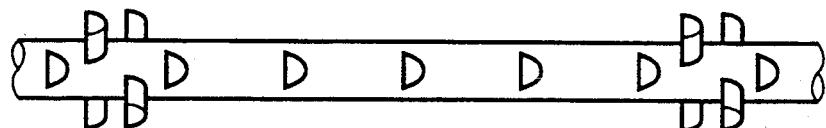
Figure 11C:
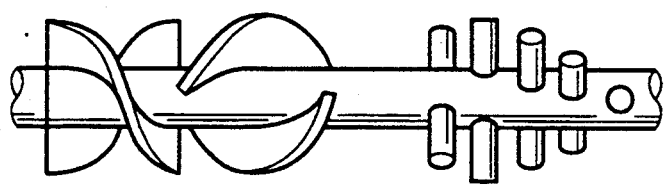
Figure 11D:
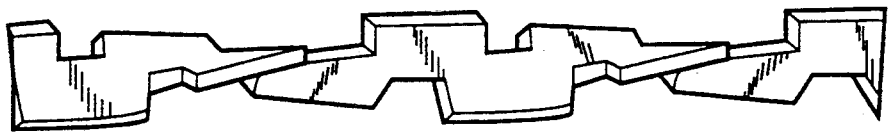

The mixer 100 includes a cylindrical casing 113, a spiral blade 115 mounted in the casing 113, and a motor 117 for driving the spiral blade 115 vertically. FIG. 10 is an enlarged diagram showing the mixer 100 of FIG. 9. When the spiral blade 115 is vibrated vertically in the casing 113, the raw material liquid and the dispersing medium in the casing 113 are mixed to form an emulsion. At that time, since the interior of the casing 113 is kept compressed when the dispersing medium and the raw material liquid are supplied under pressure with the valve 111 closed, the compressed emulsion will be formed in the mixer 100. In the mixer 100 there is mounted a diaphragm for transmitting the driving force of the motor 117 while maintaining the internal pressure of the casing 113. The spiral blade 115 mounted in the casing 113 should by no means be limited to the form shown in FIG. 10 and may be any other forms, such as a first alternative form having plural separate spiral blades (FIG. 11(a)), a second alternative form having plural projections arranged at regular phase intervals (FIG. 11(b)), a third alternative form having in combination projections and blades (FIG. 11(c)) or a fourth alternative form having a single plate itself twisted spirally with no shaft (FIG. 11(d)).

With the hollow particle manufacturing apparatus of the third embodiment, the raw material liquid, in which gas is dissolved under pressure, is dispersed in the dispersing medium liquid so that a compressed emulsion containing fine corpuscles is formed. When the valve 111 is opened, this compressed emulsion will be converted into a normal-pressure state so that hollow particles are obtained.

Fourth Embodiment

Figure 12:
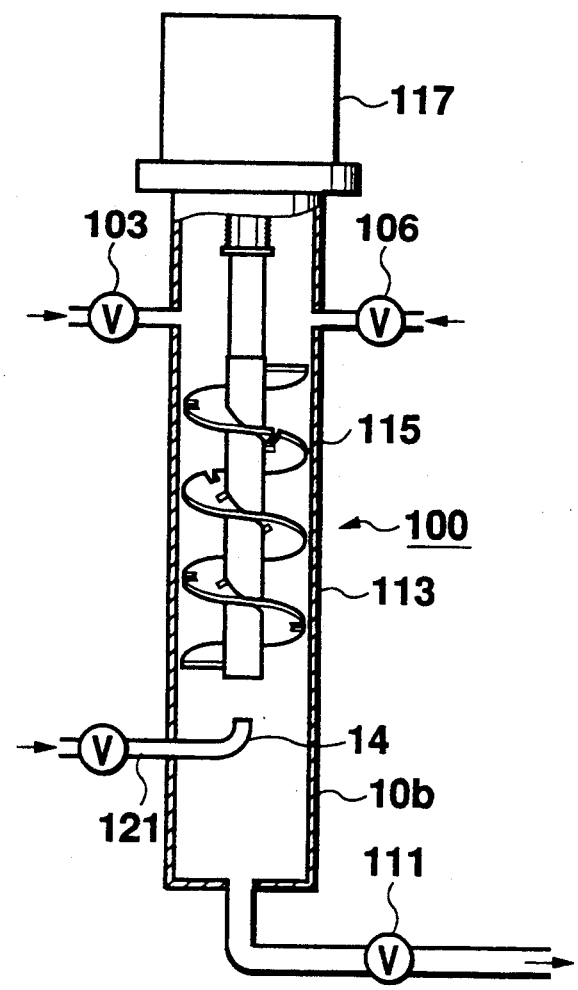
FIG. 12 is a diagram showing a manufacturing apparatus according to a fourth embodiment.

FIG. 12 shows a manufacturing apparatus according to a fourth embodiment, in which a gas supply tube 121 for supplying gas dissolvable in only the raw material liquid is mounted in the casing 113. In this embodiment, the raw material liquid is supplied via the valve 113, while the dispersing medium liquid is supplied via the valve 106. As the stirring blade 115 is vibrated vertically, an emulsion is formed in the casing 113. When gas is supplied to this compressed emulsion under pressure from a gas supply tube 121, the gas will be dissolved in only the fine corpuscles constituting the emulsion because the gas is dissolvable in only the raw material liquid. In this apparatus, the stirring blade 115 is kept vibrating vertically even when the gas is supplied under pressure so that the gas is apt to dissolve in the fine corpuscles of the raw material liquid.

Also in the hollow particle manufacturing apparatus of the fourth embodiment, when the valve 111 is opened, the emulsion is discharged to the outside to be converted into a normal-pressure state so that an emulsion containing hollow particles will be manufactured.

In either of the third and fourth embodiments, part of the emulsion produced in tile mixer may be separated and then decompressed to manufacture hollow particles (or emulsion containing hollow particles).

The ingredients of the hollow particles may be an organic substance, an inorganic substance, or a mixture of them, etc. Assuming that for the ingredients of the hollow particles, a heavy metal having a catalytic action is added to a solution obtained by dissolving polymer in an organic solvent, it is possible to manufacture hollow reaction accelerator particles carrying the catalytic heavy metal. Since this reaction accelerator particle has a hollow structure and hence has a large surface area, the particle is particularly useful as a reaction accelerator.

Figure 13:
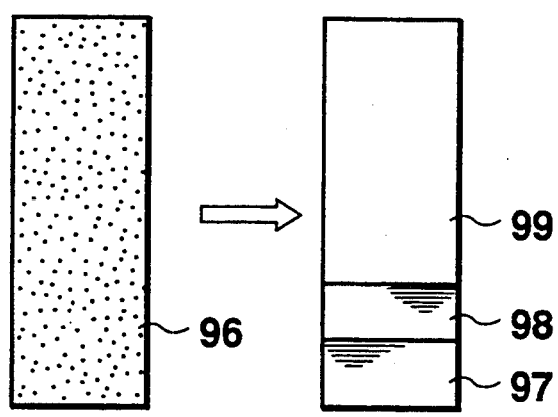
FIG. 13 is a diagram illustrating an emulsion breaker.

In any one of the foregoing embodiments, it is possible to realize an emulsion breaker as shown in FIG. 13. The emulsion breaker is performed by decompressing an emulsion 96 containing hollow particles until the hollow particles themselves burst. Namely, as the emulsion containing hollow particles is progressively decompressed, the hollows 91 of the hollow particles 90 expand until the hollow particles 90 themselves finally burst. Then water constituting a water film 95 defines a water layer 97, while oil constituting an oil film 93 defines an oil layer 98, and gas constituting the hollows 91 defines a gas layer 99. Thus as the emulsion 96 containing the hollow particles is progressively decompressed, the emulsion will be broken easily to separate water and oil from one another. In other words, when the emulsion is to be broken, it should suffice for the emulsion 96 containing hollow particles to be decompressed. This embodiment is particularly useful when the emulsion is to be reformed.

As mentioned above, according to the hollow particle manufacturing apparatus and method of this invention, it is possible to obtain an emulsion constituted by fine particles each having a very small hollow.

What is claimed is:

1. A method of manufacturing hollow particles, wherein a compressed emulsion containing liquid corpuscles formed by dissolving gas under pressure is converted from a pressurized state into a normal-pressure state.

2. A method according to claim 1, wherein said compressed emulsion is prepared by dispersing a raw material liquid, which is obtained by dissolving gas under pressure, in a compressed dispersing medium.

3. A method according to claim 1, wherein said compressed emulsion is prepared by obtaining a starting emulsion, which is obtained by dispersing a raw material liquid in a dispersing medium liquid, and then by adding gas, which is dissolvable in only said raw material liquid, to said starting emulsion under pressure.

4. A method of manufacturing an emulsion containing hollow particles, wherein a compressed emulsion containing liquid corpuscles formed by dissolving gas under pressure is converted from a compressed state into a normal-pressure state.

5. A method according to claim 4, wherein said compressed emulsion is prepared by dispersing a raw material liquid, which is obtained by dissolving gas under pressure, in a compressed dispersing medium.

6. A method according to claim 4, wherein said compressed emulsion is prepared by obtaining a starting emulsion, which is obtained by dispersing a raw material liquid in a dispersing medium liquid, and then by adding gas, which is dissolvable in only said raw material liquid, to said starting emulsion under pressure.

7. An emulsion breaking method comprising the steps of: manufacturing an emulsion, which contains hollow particles, by converting a compressed emulsion containing liquid corpuscles, which is formed by dissolving gas under pressure, from a compressed state into a normal-pressure state; and then decompressing the first-named emulsion to such a pressure that said hollow particles are broken.

* * * * *